United States Patent
Maroney et al.

(10) Patent No.: US 9,582,453 B2
(45) Date of Patent: Feb. 28, 2017

(54) I/O CARD ARCHITECTURE BASED ON A COMMON CONTROLLER

(71) Applicant: Western Digital Technologies, Inc., Irvine, CA (US)

(72) Inventors: John E. Maroney, Irvine, CA (US); Shaun Astarabadi, Laguna Niguel, CA (US); San A Phong, Cerritos, CA (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 448 days.

(21) Appl. No.: 14/150,615

(22) Filed: Jan. 8, 2014

(65) Prior Publication Data

US 2015/0052275 A1 Feb. 19, 2015

Related U.S. Application Data

(60) Provisional application No. 61/866,489, filed on Aug. 15, 2013.

(51) Int. Cl.
G06F 13/38 (2006.01)
G06F 13/40 (2006.01)

(52) U.S. Cl.
CPC .................. *G06F 13/4068* (2013.01)

(58) Field of Classification Search
CPC ..................................................... G06F 15/177
See application file for complete search history.

(56) References Cited

U.S. PATENT DOCUMENTS

| | | |
|---|---|---|
| 5,132,635 A | 7/1992 | Kennedy |
| 6,069,293 A | 5/2000 | De Somma |
| 6,557,106 B1 | 4/2003 | Yuzawa et al. |
| 6,804,748 B2 | 10/2004 | Bouvier et al. |
| 6,839,788 B2 | 1/2005 | Pecone |
| 6,856,508 B2 | 2/2005 | Rabinovitz |
| 6,906,918 B2 | 6/2005 | Rabinovitz |
| 6,957,288 B2 | 10/2005 | Metevier et al. |
| 7,000,037 B2 | 2/2006 | Rabinovitz et al. |
| 7,009,872 B2 * | 3/2006 | Alva ....................... G06F 3/061 365/158 |
| 7,042,717 B2 | 5/2006 | El-Batal et al. |

(Continued)

OTHER PUBLICATIONS

International Search Report and Written Opinion dated Dec. 2, 2014 from related PCT Serial No. PCT/US2014/051370, 9 pages.

(Continued)

*Primary Examiner* — Cheng-Yuan Tseng
(74) *Attorney, Agent, or Firm* — Young Law Firm, P.C.

(57) ABSTRACT

The embodiments provide a backplane for a storage device that is readily extensible to accommodate a range storage media. In some embodiments, the controller is provided on a motherboard. In order to support a different numbers of bays, various management riser cards are provided on the motherboard to expand the capacity of the backplane while still using the same controller. The backplane supports a serial addressing scheme and shift registers to identify ports connected to the storage device controller to allow for different numbers of storage media to be connected to the motherboard. This allows the storage device controller to use the same addressing protocol and software for any number of drive bays.

19 Claims, 3 Drawing Sheets

(56) References Cited

U.S. PATENT DOCUMENTS

| | | | |
|---|---|---|---|
| 7,271,999 B2 | 9/2007 | Rabinovitz | |
| 7,373,443 B2 | 5/2008 | Seto | |
| 7,453,707 B2 | 11/2008 | Beall et al. | |
| 7,546,478 B2 * | 6/2009 | Kubo | G06F 1/26 710/10 |
| 7,661,014 B2 | 2/2010 | Davies et al. | |
| 7,701,705 B1 | 4/2010 | Szeremeta | |
| 7,979,589 B2 | 7/2011 | Oh et al. | |
| 8,064,194 B2 | 11/2011 | Szeremeta | |
| 8,069,293 B1 | 11/2011 | Rogan et al. | |
| 8,074,092 B2 | 12/2011 | Fung | |
| 8,113,873 B1 | 2/2012 | Sarraf | |
| 8,133,426 B1 | 3/2012 | Yurchenco et al. | |
| 8,301,810 B2 | 10/2012 | Pang et al. | |
| 8,358,395 B1 | 1/2013 | Szeremeta | |
| 8,417,979 B2 | 4/2013 | Maroney | |
| 8,462,460 B1 | 6/2013 | Szeremeta et al. | |
| 8,498,088 B1 | 7/2013 | Klein | |
| 8,547,658 B1 | 10/2013 | Szeremeta | |
| 2002/0052994 A1 | 5/2002 | Khan et al. | |
| 2004/0199719 A1 | 10/2004 | Valin et al. | |
| 2006/0136644 A1 | 6/2006 | Martin et al. | |
| 2009/0319713 A1 | 12/2009 | Leung | |
| 2010/0306434 A1 | 12/2010 | Dube et al. | |
| 2010/0325455 A1 | 12/2010 | Odaguchi | |
| 2012/0033370 A1 | 2/2012 | Reinke et al. | |
| 2012/0047302 A1 | 2/2012 | Zhang et al. | |
| 2012/0192038 A1 | 7/2012 | Cho | |
| 2012/0331198 A1 | 12/2012 | Yang | |
| 2015/0006814 A1 * | 1/2015 | Phong | G06F 3/0625 711/114 |

OTHER PUBLICATIONS

John E. Maroney, U.S. Appl. No. 13/436,849, filed Mar. 31, 2012, 16 pages.

* cited by examiner

I/O CARD ARCHITECTURE BASED ON A COMMON CONTROLLER

CROSS-REFERENCE TO RELATED APPLICATIONS

This application claims benefit of U.S. Provisional Patent Application Ser. No. 61/866,489 entitled "EXTENSIBLE BACKPLANE ARCHITECTURE BASED ON A COMMON CONTROLLER" filed Aug. 15, 2013, the disclosure of which is incorporated by reference herein in its entirety.

BACKGROUND

Network attached storage (NAS) devices may comprise a wide variety of bays for their storage devices. However, as the number of drives increases, the NAS device typically requires more powerful processors and a different motherboard, redundant array of independent disks (RAID), and power and enclosure management architectures to support the different number of drives. This makes the hardware and software development and cost of the different NAS products difficult to manage.

NAS systems typically use I2C port expanders, which have limited addressing capabilities, to detect/control a fixed numbers of drives. Such I2C port expanders are only extensible by adding another port expander at another I2C address. These enclosure management topologies, however, use all of the limited I2C addressing space and can only control a limited number of drives. Unfortunately, when using a port expander, the software and control system must be modified or configured differently to address the devices. This makes both hardware and software design more complicated and costly.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
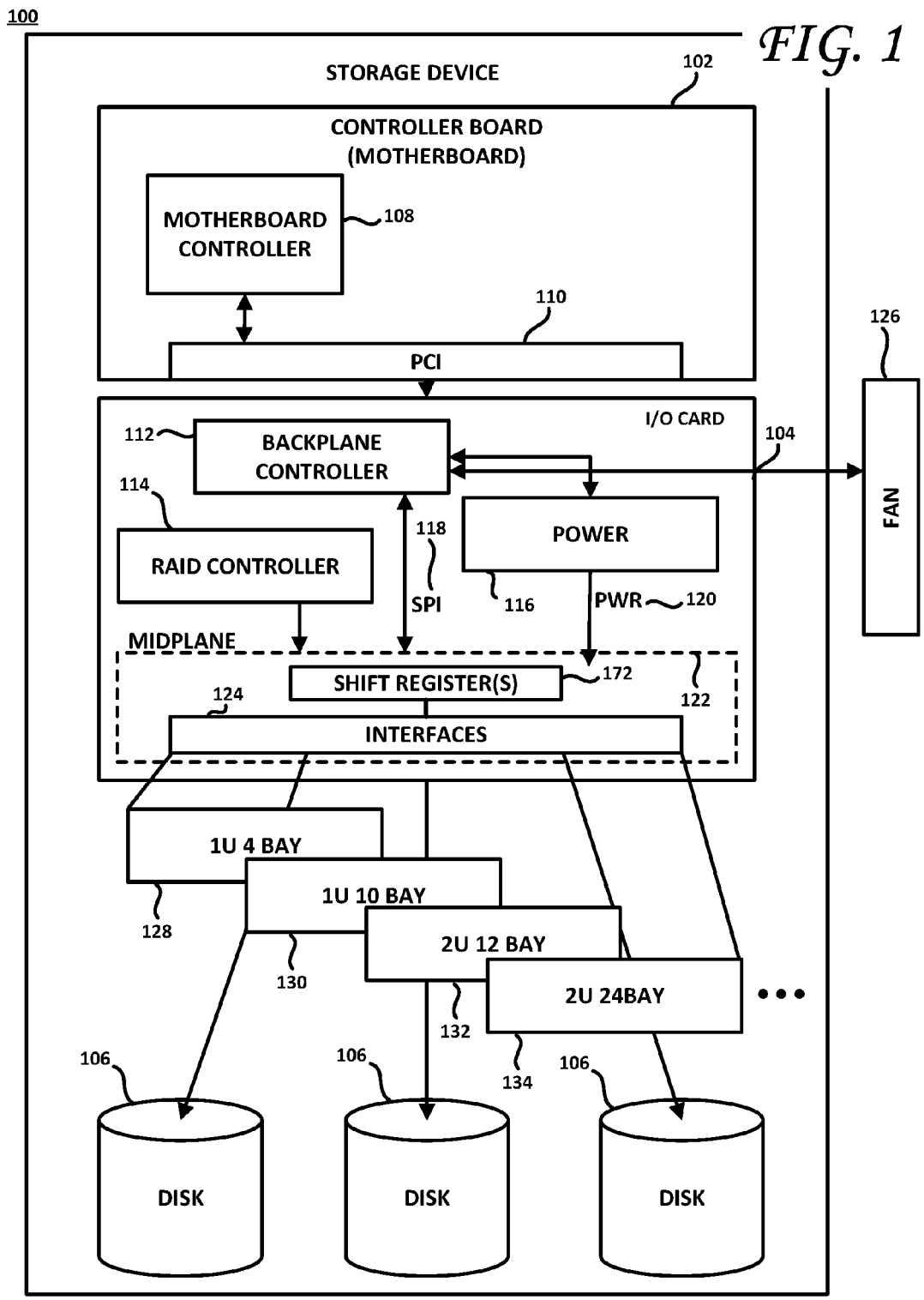
FIG. 1 shows a device according to one embodiment.

One embodiment comprises an I/O card (or extensible backplane, as the two phrases are used interchangeably herein) for a storage device, such as a NAS. The I/O card may comprise an interface configured to enable the I/O card to be coupled to a motherboard of the storage device. According to one embodiment, the interface is extensible for multiple ranges of storage. A I/O card controller on the I/O card may be configured to identify the interface and determine one or more configurations of the backplane based on the identity of the interface.

Another embodiment relates to a storage device that is extensible to multiple ranges of storage and that comprises an enclosure; a motherboard; an I/O card coupled to the motherboard and a set of drives coupled to the I/O card. The I/O card may be configured to interface with the motherboard over multiple ranges of storage based on a common architecture that can selectively address different numbers of storage devices.

One embodiment relates to an I/O card comprising an interface configured to couple to a motherboard of a storage device; a I/O card controller configured to identify the interface and to determine the configuration of a set of modular interfaces provided in the backplane based on the identity of the interface. For example, the modular interfaces may relate to power management, enclosure management (ECM) for the drives, LED status/activity, power control/sequencing, controllers for RAID, and switching between Serial Attached Small Computer Systems Interface (SAS) or Serial Advanced Technology Attachment (SATA) interfaces.

As noted, known storage devices, such as NAS devices, may comprise multiple bays to accommodate a plurality of storage media. The embodiments relate to methods and systems that employ a common architecture that may be extended for different ranges of bays for a plurality of storage devices. In particular, the architecture according to embodiments comprises an extensible interface that may be adapted to a range of numbers of bays. In one embodiment, the common architecture comprises a backplane architecture that employs serial registers and serial addressing rather than port expanders to connect to the bays.

The embodiments may be configured to auto-detect the backplane variant and the number of drives coupled to the motherboard. For example, each backplane variant may have an identifier that has a format that indicates various characteristics of the backplane, such as its model type, number of interfaces, optional components, and the like. In some embodiments, the identifier may comprise fields embedded within its format at specific locations that are recognizable by the motherboard. The motherboard may then select or map one or more configuration settings for its operations based on the identifier provided by the I/O card 104.

The motherboard may thus recognize the I/O card (which may be configured as a riser card) and may configure other components to suit. Notably, the motherboard controller may be the same for all types of devices. Similarly, the software executing on the motherboard controller may be the same or substantially the same, across configurations. In one embodiment, auto-detection may be used by the motherboard controller to configure, for example, LED configuration, power sequencing, etc.

Significantly, the common architecture is flexible and can be employed with different form factors, such as rack-mounted form factors and pedestal form factors. In addition, the embodiments enable a common I/O card to be used for any type of motherboard controller, such as Intel's Xeon or Dual Xeon, for example. As a consequence, the design and maintenance of the device driver is also simplified because the application programming interface (API) remains relatively unchanged, regardless of the number of bays supported. In other words, the number of drives becomes just a parameter rather than a primary criterion.

The disclosure relates to methods and systems for an I/O card that can be employed across different platforms. In one embodiment, rather than such functionality being embodied in the midplane, the I/O card may be configured to determine the personality of the system, such as enclosure management, related to temperature control, fault status to drives, drive presence detect, power sequencing, fan control, etc. In addition, in some embodiments, the system control and storage management (RAID) may be controlled as one personality on a single card. This feature simplifies the software design of the device since it eliminates or reduces the need for separate software development of the storage API and enclosure management API. Previously, these separate APIs required corresponding separate software development efforts, which led to delays and increased costs. Accordingly, the I/O card according to one embodiment enables, but does not require the integration of enclosure management and RAID management. For example, the embodiments enable customizing which drives are configured as boot drives and which drives are configured as data drives.

Aspects of embodiments are described herein in the context of rack-mounted NAS devices. However, the embodiments herein are applicable to any form factor, such as pedestal or desktop form factors. In addition, the embodiments may be applicable to different types of devices, such as servers, routers, etc. Furthermore, the embodiments may be readily deployed for extensibility for Just a Bunch of Ordinary Disks (JBODs) and RAIDBODs.

As shown in FIG. 1, a device 100 according to one embodiment comprises a controller board (also denoted as motherboard) 102, an I/O card 104 (also denoted as extensible backplane herein), and a set of drives or storage devices 106. The set of drives 106 may be configured as RAID and the device 100 may be configured as a NAS. In the exemplary implementation shown in FIG. 1, the same motherboard 102 and motherboard controller 108 may be used on NAS devices having different configurations and numbers of bays. The I/O card 104 may be configured for RAID control, power control and enclosure management duties, among other possible functions. The I/O card 104 may be physically configured as a riser card coupled to the motherboard 102 so that the motherboard/controller board 102 can accommodate different numbers of drives and different types of interfaces, such as SAS or SATA. In some embodiments, the I/O card 104 may be a standalone card that is separate from, although coupled to, the motherboard 102. In addition, in some embodiments, the enclosure management and/or other duties may be discharged by a separate, standalone card as well.

As shown, the controller board 102 of device 100 may comprise a motherboard controller 108 coupled to an interface, such as a Peripheral Component Interconnect (PCI) interface or a PCI Express (PCIe) interface 110. The interface 110 may be coupled to an extensible backplane or I/O card 104. The I/O card 104 may comprise a I/O card controller 112 that may be configured to (among other functions) detect when a storage drive 106 is present on the interface 124 via, for example a serial peripheral interface (SPI) signal 118 and to turn on the power signals 120 to the storage drive 106 via a power controller 116. The power controller 116 may be configured to supply both 5V and 12V, for example, to the drives 106 via, for example, a 16 pin drive power connector on the I/O card 104. The power controller 116 may be configured to provide other voltage levels. The I/O card 104 may be further configured to control a fan 126. According to one embodiment, the I/O card controller 112 may be coupled to a fan 126 and may be configured to communicate with the motherboard controller 108 via an interface to dynamically control the fan 126.

The interface 124 may be configured, according to one embodiment, as an extensible drive interface configured to implement a serial addressing scheme to access the storage drives 106. Toward that end, the midplane 122 comprising the extensible drive interface 124 may comprise one or more shift registers 172 to implement the serial addressing format. The midplane 122 may also be configured to comprise on-board SATA connectors configured to deliver power signals 120 and SATA signals 118 from the I/O card controller 112 and/or RAID controller 114.

As shown, the architecture of FIG. 1 may be extended to different numbers of drives in different configurations. For example, a 1U (rack unit) NAS may be implemented that comprises a common motherboard controller 108 and I/O card 104, which may be extended to, for example, 4 bays and 10 bays, as shown at 128 and 130. Alternatively, the architecture shown in FIG. 1 may implement a 2U NAS having a common controller board 102 and I/O card 104, which may be extended to 12 bays and 24 bays, as shown at 132 and 134, respectively. Other implementations and configurations are possible.

Significantly, since the storage devices such as shown in FIG. 1 use a common architecture, which may be scaled from, for example, a 4 bay pedestal to 24 bay—2U rack mount, the devices (although of different size) may employ the same software for drive power control, sequencing, RAID management, enclosure management, serial addressing, drive detection and/or LED control and the like. In one embodiment, the motherboard controller 108 may be configured to perform an auto-detect of the I/O card 104 and determine the number of bays that have been configured.

One embodiment comprises one or more shift registers 172 and a serial addressing scheme to address the drives/bays coupled to the system. The serial addressing scheme allows the software to use same protocol for any number of devices. For example, the addresses of the drives/bays may be streamed into the shift register(s) in a serial fashion. The shift registers 172 may be, according to one implementation, two 74LV594A, which are 8-bit shift registers with output registers from Texas Instruments. The number of shift registers 172 may be adjusted as needed. The addresses may be identifiable based on a framing sequence of bits, such as a fixed number of 0 or 1 bits, or some other reserved value known to the motherboard controller 108. Accordingly, much or all of the software and hardware controlling the device can thus be moved from the midplane 122 to the I/O card controller 112, the RAID controller 114 and/or the motherboard controller 108. Such software may be configured to identify the number of drives by reading a drive presence address as a sliding sequence of bits as they are output or otherwise read from the shift register(s) 172. For example, the motherboard controller 108 and software may utilize a common protocol to recognize virtually any number of devices and any address, since the addresses are serially-encoded. Such an addressing scheme and software design is not possible with I2C port expanders. In some embodiments, this common architecture enables several changeable features with the same controller and software. Storage (drive) management, e.g., RAID may now be configured as a changeable feature. Storage (drive) power management features, such as power sequencing, hot swap control, etc., may also now be configured as a changeable feature. According to one embodiment, therefore, the same motherboard 102 and I/O card 104 may be configured to handle different numbers of drives 106 by swapping one midplane 122 for another midplane configured with a different number and/or type of connectors and interfaces. The serial addressing scheme and shift registers 172 enable a common addressing scheme, irrespective of the number of bays and/or drives 106 provided.

For enclosure management, a microcontroller may now be used to control drive power enable (sequencing), drive fault and status LEDs, drive presence sense, fan RPM control, etc. For example, since the drive presence signal indicates the number of drives installed, the microcontroller may use this parameter to determine the number LEDs that need to be controlled, which allows a single microcontroller firmware set to be used across a multiple drive chassis.

Figure 2:
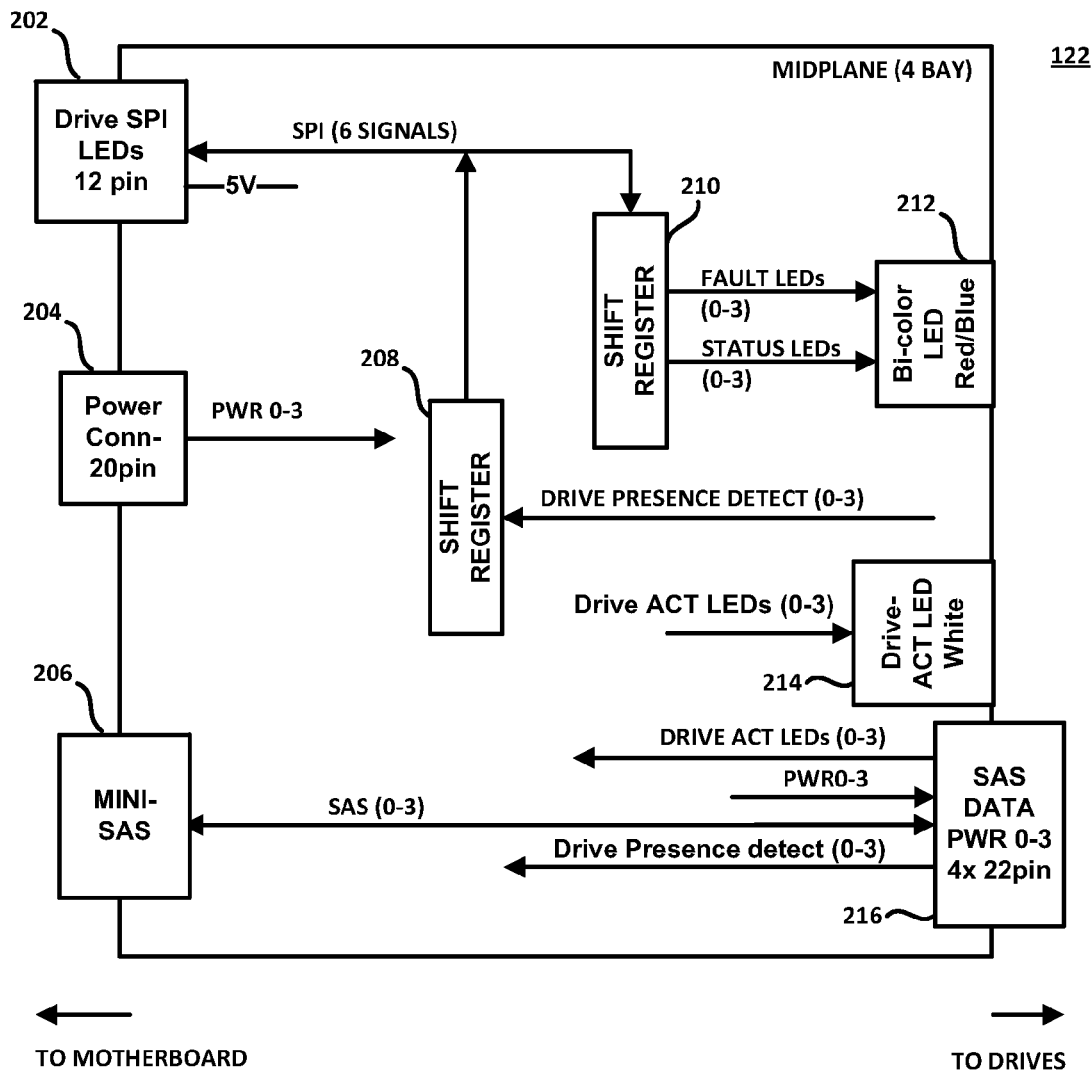
FIG. 2 is a block diagram of the midplane of the device of FIG. 1, according to one embodiment.

FIG. 2 is a block diagram of one possible implementation of the midplane 122 of the device of FIG. 1, according to one embodiment. The midplane, as shown in FIG. 2, does not comprise a I/O card controller or a RAID controller, as such functionality is embodied in the I/O card 104. Rather, the midplane 122 may comprise motherboard-side connectors configured to couple to mating connectors on the motherboard 102 and drive-side connectors configured to couple with mating connectors on the drives 106. Such connectors may be configured for power, data, drive indicators (e.g., LEDs) and/or for other purposes. On the motherboard side, the midplane 122 may comprise a Drive SPI connector (a 12 pin connector according to one implementation), configured to connect to LEDs (e.g., fault and status LEDs). A power connector 204 (e.g., a 20 pin connector) may also be provided, coupled to the power interface 116 of FIG. 1. A data connector (e.g., a mini-SAS connector in one implementation) 206 may be provided and coupled to the I/O card controller 112 and/or the RAID controller 114 of FIG. 1.

A shift register 208 may be provided to receive drive presence detect signals from the drives. In the implementation of FIG. 2, the midplane 122 is configured for four drives, numbered 0-3. An 8-bit shift register may indicate to the I/O card controller 112 which of the drives 106 has asserted the drive presence signal during, for example, initialization of the device. A shift register 210 may be provided, to drive LEDs 212 on the midplane 122, both to indicate a possible fault (e.g., red LEDs) as well as to indicate the status of the drives (e.g., blue LEDs). "Drive active" LEDs 214 (e.g., white LEDs) may be provided on the I/O card 104 to indicate which of the drives 0-3 are currently active. A drive-side full size data connector may be provided, as shown at 216. The connector 216 may be coupled to the motherboard-side connector 206, and may be configured to carry data, drive power signals, drive presence detect signals and drive active LED signals, for example. According to one implementation, the connector 216 may be a 22 pin SAS connector. The midplane 122 shown in FIG. 2 may be readily adapted to other configurations, such as a 1U 10 bay configuration or a 2U 12 or 24 bay configurations, among other possibilities. Through the shift registers 208, 210 and serial addressing, the LEDs 212, 214 (or other indicators) may be powered on and enabled to show the activity, status and/or fault of each of the drives 106. The I/O card 122 may, as shown in FIG. 2, comprise one or more on-board connectors 202 that are configured to deliver storage device activity, storage drive status and storage device fault signals to each storage drive 106 that is detected to be connected to the I/O card 122.

Therefore, as shown in FIGS. 1 and 2, the midplane 122 does not comprise any backplane or RAID controllers, as such are relegated to the I/O card 104. According to one embodiment, the midplane 122 may be modular, thereby enabling it to be swapped out when a different configuration (such as a 1U 9 bay implementation, for example) is desired. The midplane 122, therefore, may be swapped out at modest cost and without requiring software changes.

In one embodiment, the I/O card 104 comprising I/O, RAID, power management and ECM functionalities may be configured as a riser card configured to plug into the controller board (motherboard) 102. Such a riser card may be configured to provide additional connections to allow for additional bays to be added and controlled by the I/O card controller 112.

According to one embodiment, the motherboard 102 may also be configured to supply additional expansion slots (for example, PCIe slots) that may be disposed in an orientation that is parallel to the controller board 102 to accommodate for the limited height available in a 1U rack.

The embodiments also enable modular components. Modular components may be desirable in some embodiments because they are readily replaceable and may be configured to use less power, to be less costly, and to produce less heat. For example, devices according to embodiments may employ, for example, modular power management; modular/extensible ECM for the drives, LED or other indicator status/activity, modular controllers for RAID; and switching between SAS or SATA interfaces.

According to one embodiment, the I/O card controller 112 and the RAID controller 114 may be separate controllers, as shown in FIG. 1. A suitable RAID controller may be obtained from, for example, Marvell Technology Group, Ltd. One such suitable RAID controller is Marvell's 88SE9480, a PCIe 2.0 x8 to 8 SAS/SATA 6 Gb/s ports RAID controller. Other RAID controllers may also be used. In such a configuration, the RAID controller functions to offload many drive-related RAID functions from the I/O card controller 112. The RAID controller 114 may be configured to communicate with the motherboard 102 via, for example, an x8 PCIe interface. In one implementation, the I/O card controller is a TI MSP430 microcontroller from Texas Instruments, Inc. The I/O card controller may be configured to communicate with the motherboard 102 over a SMBus, for example.

According to one embodiment, however, the functionality of the RAID controller 114 may be incorporated into the I/O card controller 112, or vice versa. In some non-RAID embodiments, a RAID controller 114 and/or the functionality thereof may not be provided. According to one embodiment, the I/O card controller 112 and/or the RAID controller 114 may be configured to manage the spin-up sequencing of the drives 106 upon startup thereof. For example, the I/O card controller 112 and/or the RAID controller 114 may be configured to stagger the spin-up of drives to limit the current draw by the drives 106 on startup to some predetermined limit.

Significantly, the extensible architecture presented according to one embodiment does not require new software, enclosure management services or power sequencing due to its modularity. This allows the use of a common software design for multiple products since the same addressing scheme is used for any number of drives.

According to one embodiment, upon power on, a RAID Option Read Only Memory (ROM) may be initialized, whereupon the drives 106 may be detected by the I/O card controller 112 using drive presence signals and powered on. The boot drive(s) may then be identified and the operating system stored thereon may then be loaded. As part of the thermal ECM, the I/O card controller 112 may communicates with the motherboard controller 108 via, for example, a SMBus, to dynamically control the speed of the fan 126 to cool down the system as needed.

Figure 3:
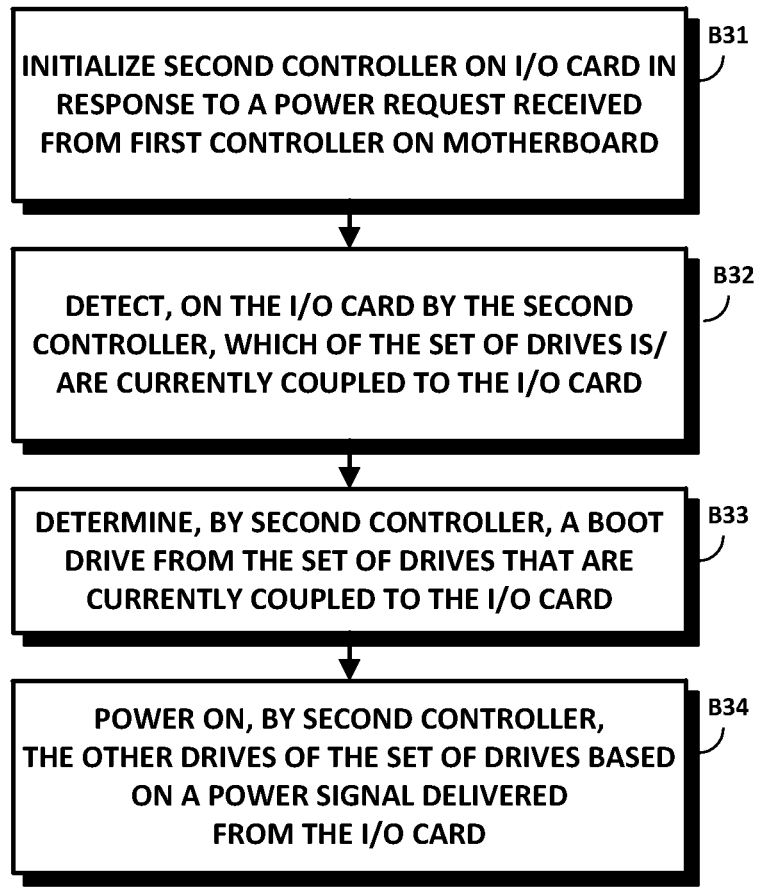
FIG. 3 is a flowchart of a method according to one embodiment.

FIG. 3 is a block diagram of a method according to one embodiment. Indeed, FIG. 3 shows a method of powering on a storage device. In this embodiment, the storage device comprises a first controller on a motherboard, as shown at 108 in FIG. 1, an I/O card 104 (also called I/O card herein) coupled to the motherboard 102, and a set of drives 106 coupled to the backplane 104. As shown, block B31 calls for initializing, on the I/O card 104, a second controller 112 in response to a power on request received from the first controller 108 on the motherboard 102. Thereafter, as shown at block B32, the second controller 112 on the I/O card 104 may detect which of the set of drives 106 is/are currently coupled to the I/O card. From the drives 106 detected to be currently coupled to the I/O card 104, a boot drive may be identified or determined, as called for by block B33. As shown at B34, the identified boot drive may then be powered on by the second controller 112. Thereafter, the other drives of the set of drives may be powered on (all at once or one or more sequentially in turn), based on a power signal 120 delivered from the I/O card 104.

According to one embodiment, initializing the second controller in block B1 may include initializing a third controller configured as a controller for a redundant array of independent disks (RAID), such as shown at 114 in FIG. 1. The second controller 112 may be configured to deliver power, along with power controller 116, to the other drives 106 based on a power enable signal 120 via a drive interface 124 on the I/O card 104. According to one embodiment, the interface 124 may include a SATA or SAS interface. Other configurations are possible. The first controller (i.e., motherboard controller 108) may then issue one or more enclosure management commands that are received at the second controller 112. The second controller 112 may then execute the received enclosure management commands. Such enclosure management commands may comprise, for example, commands to dynamically control the fan or fans 126. The fan-controlling commands are executed, according to one embodiment, by the second controller (the I/O card controller 112 in FIG. 1), rather than by the motherboard controller 108.

Significantly, the active backplane or I/O card 104 may comprise both a RAID controller 114 and drive connectors (e.g., 22 pin SATA connectors). As the drives 106 may connect directly to the I/O card 104, data and power cables need not be used. The RAID controller 114 may then drive both boot and data drives directly, without external power and data cables. According to one embodiment, the boot and data drives need not have the same form factor. In one implementation, for example, the boot drives have a 2.5" form factor, while the data drives may have a 3.5" for factor. The boot drive or drives may be configured, for example, as JBOD, RAID0 or RAID1 sets, while the data drives may be configured, for example, as RAID1, RAID5 or RAID6 sets. Other configurations are possible.

The features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments, which do not provide all of the features and advantages set forth herein, are also within the scope of this disclosure.

What is claimed is:

1. An input/output (I/O) card for a storage device, comprising:
    an interface to a controller board;
    an extensible drive interface comprising:
        a set of modular connections for connection to a set of storage drives; and
        at least one shift register configured to receive a stream of addresses of the set of storage drives via the set of modular connections, the at least one shift register being configured to enable the extensible drive interface to implement a serially-encoded address format to access the storage drives;
    at least one power interface configured to deliver one or more power signals to the storage drives; and
    an I/O card controller configured to detect when a storage drive is present on the extensible drive interface and to turn on the power signals to the storage drive.

2. The I/O card of claim 1, wherein the I/O card controller is further configured to provide information identifying a configuration of the I/O card to a motherboard controller.

3. The I/O card of claim 1, wherein the I/O card controller is configured as a controller for a redundant array of independent disks (RAID).

4. The I/O card of claim 1, wherein the I/O card controller is further configured to control a fan.

5. The I/O card of claim 4, wherein the I/O card controller is further configured to:
    communicate with the controller board via the interface to the controller board; and
    dynamically control the fan.

6. The I/O card of claim 1, wherein the set of modular connections comprises on-board Serial Advanced Technology Attachment (SATA) connectors that deliver power signals from the at least one power interface and SATA signals from the I/O card controller.

7. A storage system, comprising:
    a motherboard comprising a motherboard controller configured to control the storage system;
    a set of storage drives; and
    an input/output (I/O) card coupled to the motherboard via a first interface and coupled to the set of storage drives via an extensible storage interface, the extensible storage interface comprising:
        a set of modular connections for connection to the set of storage drives; and
        at least one shift register configured to receive a stream of addresses of the set of storage drives via the set of modular connections, the at least one shift register being configured to enable the extensible storage interface to implement a serially-encoded address format to access the storage drives;
    wherein the I/O card comprises:
        at least one power interface configured to deliver one or more power signals to the storage drives, and
        an I/O card controller configured to detect when a storage drive is present on the extensible storage interface and to turn on the power signals to the storage drive via the at least one power interface.

8. The storage system of claim 7, wherein the I/O card controller is configured as a controller for a redundant array of independent disks (RAID).

9. The storage system of claim 7, wherein the motherboard is configured to discover a configuration of the I/O card and to configure program code running on the motherboard controller based on the discovered configuration of the I/O card.

10. The storage system of claim 7, wherein the set of modular connections comprises on-board SATA connectors that are configured to deliver the power signals to the set of storage drives.

11. A method of powering on a storage device, wherein the storage device comprises a first controller on a motherboard, an input/output (I/O) card coupled to the motherboard, and a set of drives coupled to the I/O card, the method comprising:

initializing, on the I/O card, a second controller in response to a power on request received from the first controller;

detecting, on the I/O card by the second controller, which drives of the set of drives are currently connected to the I/O card;

determining, by the second controller, a boot drive from the set of drives that are currently connected to the I/O card;

powering on, by the second controller, the boot drive; and after the boot drive is powered on, powering on, by the second controller, the other drives of the set of drives that are currently connected to the I/O card based on a power signal delivered from the I/O card.

12. The method of claim 11, wherein initializing the second controller comprises initializing a third controller configured as a controller for a redundant array of independent disks (RAID).

13. The method of claim 11, wherein the second controller is configured to deliver power to the other drives based on a power enable signal via a drive interface on the I/O card.

14. The method of claim 13, wherein the second controller is configured to deliver the power enable signal via a SATA drive interface.

15. The method of claim 11, further comprising:
receiving, from the first controller, one or more enclosure management commands at the second controller; and
executing, by the second controller, the received enclosure management commands.

16. The method of claim 15, wherein receiving one or more enclosure management commands comprises receiving one or more commands for controlling a fan on the I/O card.

17. A storage system, comprising:
a motherboard comprising a motherboard controller configured to control the storage system;
a set of storage drives; and
an input/output (I/O) card coupled to the motherboard via a first interface and coupled to the set of storage drives via an extensible storage interface, the extensible storage interface comprising:
  a set of modular connections for connection to the set of storage drives; and
  at least one shift register configured to receive a stream of addresses of the set of storage drives via the set of modular connections, the at least one shift register being configured to enable the extensible storage interface to implement a serially-encoded address format to access the storage drives;
wherein the I/O card comprises:
  at least one power interface configured to deliver one or more power signals to the storage drives, and
  an I/O card controller configured to detect when a storage drive is present on the extensible storage interface and to enable at least one indicator, for each detected storage drive, of at least one of an activity of the storage drive, a status of the storage drive and a fault of the storage drive.

18. The storage system of claim 17, wherein the serially-encoded address format is configured to enable the at least one indicator.

19. The storage system of claim 17, wherein the set of modular connections comprises at least one on-board connector configured to deliver storage device activity, storage drive status and storage device fault signals to each detected storage drive.

* * * * *